No. 855,308.  
PATENTED MAY 28, 1907.
I. HANSEN.  
FLY TRAP.  
APPLICATION FILED OCT. 13, 1906.
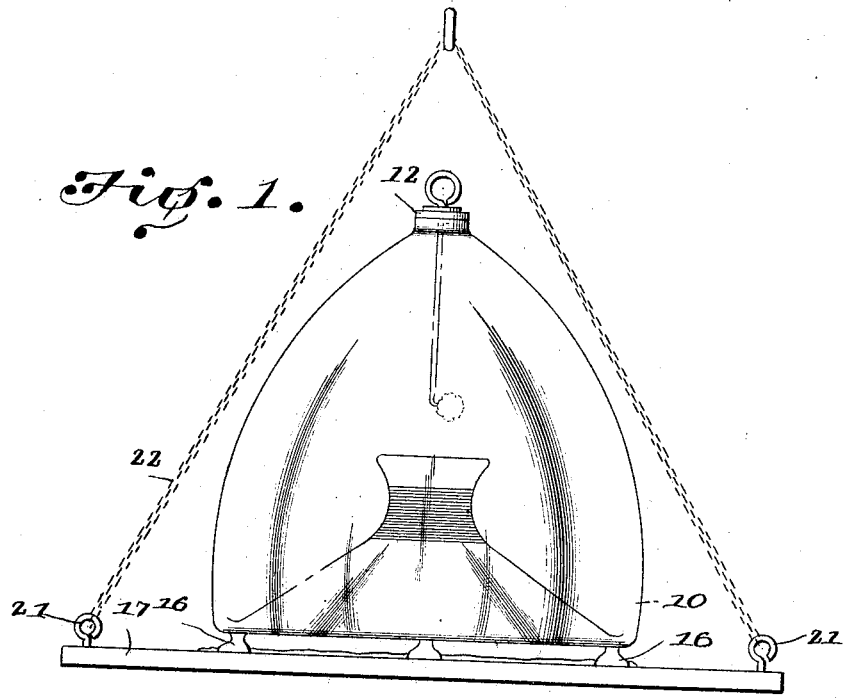
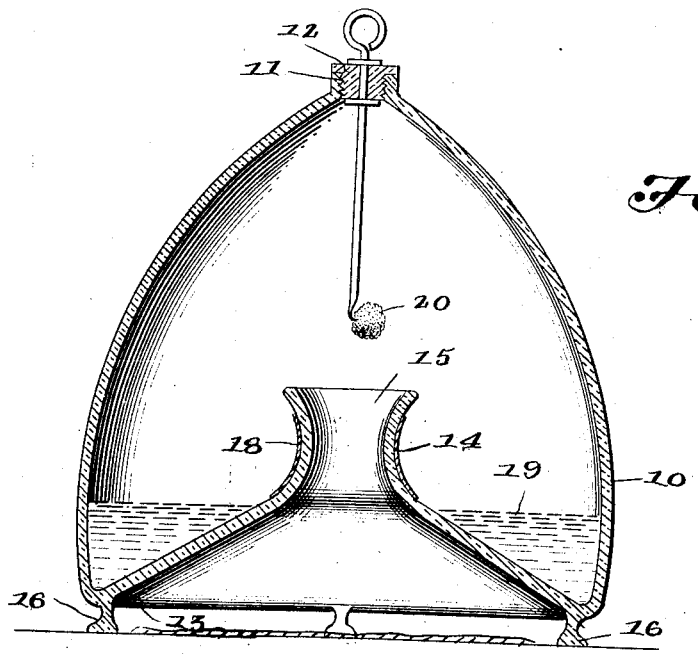
Witnesses  
W. S. Rockwell  
J. W. Zuinn
Inventor  
Ingvart Hansen  
By Chandlee & Chandlee  
Attorneys

UNITED STATES PATENT OFFICE.

INGVART HANSEN, OF OROFINO, IDAHO.

FLY-TRAP.

No. 855,308.      Specification of Letters Patent.      Patented May 28, 1907.

Application filed October 13, 1906. Serial No. 338,744.

*To all whom it may concern:*

Be it known that I, INGVART HANSEN, a citizen of United States, residing at Orofino, in the county of Nez Perces, State of Idaho, have invented certain new and useful Improvements in Fly-Traps; and I do hereby declare the following to be a full, clear, and exact description of the invention, such as will enable others skilled in the art to which it appertains to make and use the same.

This invention has relation to that kind of fly-traps that comprise a glass body or inclosure with an upward and inwardly inclined body open at the center, the body being supported upon legs so that flies feeding below the bottom and starting to fly away will be inclined to go toward the light or lightest area which is through the opening formed through the raised center of the body, and consequently the flies will be trapped in the glass inclosure.

My improvements consist of means for inducing the flies, where once starting up the lower surface of the upwardly inclined bottom and reaching a certain point thereon to immediately fly upward through the said central opening in the bottom, and when once inside, will not be induced to crawl or fly back through the opening by which they entered, as is the case with fly-traps of this class as heretofore produced.

The invention is fully and clearly portrayed in the annexed drawings, forming a part of this specification in view of which the improvements will first be described with respect to their construction and manner of use or operation, and then be pointed out in the subjoined claim.

Of the said drawings—Figure 1 is a side view of the invention, showing means for suspending it from a hook or nail. Fig. 2 is a central sectional view of the invention.

Similar numerals of reference designate similar parts or features, as the case may be, wherever they occur.

In the drawings, 10 designates the body of the trap which may for the most part be made of glass. The inclosure is approximately of half-oval form with an opening 11 at its top which is normally closed by a stopple 12. The bottom 13 of the inclosure or body is inclined upward from its outer edge toward its center where it terminates in a neck 14 flared outwardly at upper end 15 providing an opening of wide area, wider than the neck 14. The bottom of the body at its outer edge is provided with legs 16 so that when the device is placed upon a board 17, or like means, the flies can crawl under the bottom where treacle or sugar may be placed for them to feed upon, and when they start to fly away they will go upward toward the light and either fly through opening 15 or crawl up on the upwardly inclined sides to the opening whence they will fly into the inclosure.

Unless the opening in the top is quite capacious to let the light therethrough in good volume many flies crawl out on the board 17 to the light under the bottom of the trap and are not caught. Again, when the opening 15 is spacious many flies after getting into the trap return through the opening and under the bottom and thus escape.

In my improvements I make the opening spacious and flared as explained, and coat a zone 18 of the neck and top of the body with an opaque substance or otherwise render said zone opaque so that the flies crawling up on the lower surface of the bottom and reaching the opaque zone will see the greatest light thereabove and fly through the opening, while should they start to return from the receptacle or inside of the trap through the neck, they will turn away when reaching the dark opaque zone and fly back toward the light in the body of the trap.

It is designed to fill the space 19 at the bottom around the raised center with beer, soapsuds or water for the drowning of the flies caught in the trap, while a bait covered with treacle or the like 20 may be suspended from the stopple 12 to attract the flies into the trap.

The board 17 may be provided with screw-eyes 21 for the attachment of chains 22 to enable the trap to be hung up similar to a bird cage.

The trap may be cleansed by removing the stopple 12 and pouring or emptying out the contents and rinsing it in a way well known.

What is claimed is—

A fly-trap comprising an inclosure of glass having a bottom upwardly and inwardly inclined from its edges and terminating in a neck having a flared mouth opening into the inclosure, an annular section of the neck being coated to render it opaque.

In testimony whereof, I affix my signature, in presence of two witnesses.

INGVART HANSEN.

Witnesses:
P. H. BLAKE,
J. W. BLAKE.